United States Patent
Alibakhsh et al.

(10) Patent No.: US 6,859,836 B2
(45) Date of Patent: Feb. 22, 2005

(54) SYSTEM AND METHOD FOR PROVIDING LOOK AHEAD SOCKET GENERATION

(76) Inventors: Massoud Alibakhsh, 3538 Emperor Way, Tucker, GA (US) 30084; Shahram Famorzadeh, 1660 Peachtree St., #5407, Atlanta, GA (US) 30329; Gerald Holmann, 1750 Briarwood Rd., #DD3, Atlanta, GA (US) 30329

(*) Notice: Subject to any disclaimer, the term of this patent is extended or adjusted under 35 U.S.C. 154(b) by 818 days.

(21) Appl. No.: 09/819,945

(22) Filed: Mar. 28, 2001

(65) Prior Publication Data

US 2001/0056505 A1 Dec. 27, 2001

Related U.S. Application Data

(60) Provisional application No. 60/192,965, filed on Mar. 29, 2000.

(51) Int. Cl.$^7$ .............................................. G06F 15/16
(52) U.S. Cl. ...................................... 709/227; 709/228
(58) Field of Search ................................ 709/227, 228

(56) References Cited

U.S. PATENT DOCUMENTS

| | | | | |
|---|---|---|---|---|
| 5,754,830 A | * | 5/1998 | Butts et al. ................. | 719/311 |
| 5,758,084 A | * | 5/1998 | Silverstein et al. ......... | 709/228 |
| 5,931,913 A | * | 8/1999 | Meriwether et al. ........ | 709/227 |
| 6,073,177 A | * | 6/2000 | Hebel et al. ................ | 709/228 |
| 6,199,111 B1 | * | 3/2001 | Hara et al. .................. | 709/227 |
| 6,308,238 B1 | * | 10/2001 | Smith et al. ................ | 710/310 |
| 6,484,206 B2 | * | 11/2002 | Crump et al. ............... | 709/227 |
| 2002/0078208 A1 | * | 6/2002 | Crump et al. ............... | 709/227 |

* cited by examiner

Primary Examiner—Krisna Lim

(57) ABSTRACT

A system and method for providing look ahead socket generation is disclosed. Generally, when a client application requests communication with a server application, protocol associated with the client application requests an open connected socket from a socket pool. The protocol receives the open connected socket and assigns the socket to the client application to provide communication between the client application and the server application. The socket pool is replenished after reception of the socket to ensure that a predefined number of open connected sockets is maintained within the socket pool. Established communication between the client application and the server application is then maintained by the protocol.

43 Claims, 4 Drawing Sheets

SYSTEM AND METHOD FOR PROVIDING LOOK AHEAD SOCKET GENERATION

CROSS-REFERENCES TO RELATED APPLICATIONS

This application claims the benefit of U.S. Provisional Application No. 60/192,965, filed Mar. 29, 2000, which is incorporated herein by reference in its entirety.

FIELD OF THE INVENTION

The present invention relates generally to computer networking, and more particularly, to socket generation.

BACKGROUND OF THE INVENTION

Decreases in computer prices have resulted in many households and businesses having at least one computer. In fact, many households and businesses have more than one computer, wherein the computers comprise many of the same programs. These computers are typically logically connected, creating a logical network wherein data may be shared between computers. Various languages, or programs, are used between networked computers. One such language is Java, developed by Sun Microsystems. Java is a high-level programming language that is object-oriented, yet simple enough to eliminate language features that cause common programming errors. Java source code files are compiled into a format called bytecode, which can then be executed by a Java interpreter. Compiled Java code can run on most computers because Java interpreters and runtime environments, known as Java Virtual Machines (VMs), exist for most operating systems, including, but not limited to, UNIX, the Macintosh OS, and Windows.

A Java remote method invocation (RMI) application programming interface (API) allows an object running in one VM to invoke methods on an object running in another VM. Distributed applications, such as RMI, are often comprised of two or more tiers, namely, a server application tier, a client application tier, and sometimes, one or more middle tiers. A typical server application creates remote objects, makes references to the objects accessible, and waits for client applications to invoke methods on these remote objects. A typical client application obtains a remote reference to one or more remote objects in the server application and then invokes methods on the objects. RMI provides the mechanism by which the server application and the client application communicate and pass information back and forth. Such an application is sometimes referred to as a distributed object application. Therefore, RMI provides for remote communication, from the client application to the server application, or vice versa, between programs written in the Java programming language.

While both the client application and the server application may be located on the same computer, typical distributed applications provide the client application and the server application on separate networked computers. Communication between the computers within the network, or within the same computer, is typically performed through the use of sockets. A socket is a software channel, or object, through which applications can connect with each other and communicate. In fact, one of the most direct ways of communicating between different application components is to use sockets. The use of sockets simplifies program development because the programmer need only focus on manipulating the socket and can rely on the operating system to actually transport messages across the network correctly.

With the use of sockets, a client computer (one having the client application therein) and a server computer (one having the server application therein) are logically connected for the exchange of data. Specifically, the client application initiates a connection with the server application, while the server application waits for the client application to initiate the connection. In order for the two computers to communicate effectively, it is often necessary that they each implement a mutually acceptable application protocol (e.g., RMI).

Each computer within the network is identified by an address. Within transmission control protocol/Internet protocol (TCP/IP) networking, as is typical of most networks, the address refers to an Internet protocol (IP) address, such as, for example, 123.456.7.8. Separate from the IP address that specifies a particular computer, each computer has a number of ports that allow the handling of multiple connections simultaneously.

A first application within a first computer, that wishes to receive a connection from a second application within a second computer, typically asks an operating system within the first computer to create a socket and bind it to a port. The first application, after creating the socket, waits and listens on the socket it has created to receive incoming connections. The second application also creates a socket for communicating with the first application, or receiver. The first computer specifies the IP address and the port number of the receiving end. Thereafter, the two programs establish a communication through the network using respective sockets. The two programs may then exchange information, each by writing to and reading from the corresponding sockets.

RMI is run on most VMs and typically handles socket generation requests that are executed by an operating system. In addition, RMI handles socket manipulation after the operating system has opened a socket, as well as determining whether new sockets must be opened or whether an unused socket may be used for an application. Unfortunately, if an established socket is not used after a certain amount of time, RMI closes the socket. As known in the art, socket closure is performed to decrease the excessive use of system resources that are required to maintain a socket. Examples of such resources include, but are not limited to, memory and processor allocation.

One way to prevent socket closure is to send a "keep alive" message (i.e.: ping) from the client to the server or, from the server to the client. Unfortunately, this method of maintaining a socket is costly to bandwidth since "keep alive" messages are constantly being transmitted. Further, the management of "keep alive" messages is demanding on memory resources and on the server processor since the reception of such messages by the server requires processing.

Therefore, the creation and management of sockets is important in providing an efficient computer network.

BRIEF SUMMARY OF THE INVENTION

In light of the foregoing, the preferred embodiment of the present invention generally relates to a system and method for generating and maintaining a pool of sockets to enable uninterrupted communication within a network.

Generally, describing the socket generation system and method, the system utilizes a client application that is stored within a client computer, which requests communication with a server application that is stored within a server computer. As a result of the request, protocol defined within the client computer requests an open connected socket from a socket pool stored within the client computer to provide communication with the server application. The socket pool is then replenished by the client computer. Established communication between the client application and the server application is then handled by the protocol.

BRIEF DESCRIPTION OF THE SEVERAL VIEWS OF THE DRAWINGS

The present invention will be more fully understood from the detailed description given below and from the accompanying drawings of the preferred embodiments of the invention, which, however, should not be taken to limit the invention to the specific embodiments, but are for explanation and better understanding. Furthermore, the drawings are not necessarily to scale, emphasis instead being placed upon clearly illustrating the principles of the present invention. Finally, like reference numerals in the figures designate corresponding parts throughout the several drawings.

DESCRIPTION OF THE PREFERRED EMBODIMENTS

The socket generation system of the present invention can be implemented in software, firmware, hardware, or a combination thereof. In the preferred embodiment of the invention, which is intended to be a non-limiting example, a portion of the system is implemented in software that is executed by a computer, for example, but not limited to, a server, a personal computer, workstation, mini computer, or mainframe computer.

The software-based portion of the system, which comprises an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device. The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

Figure 1:
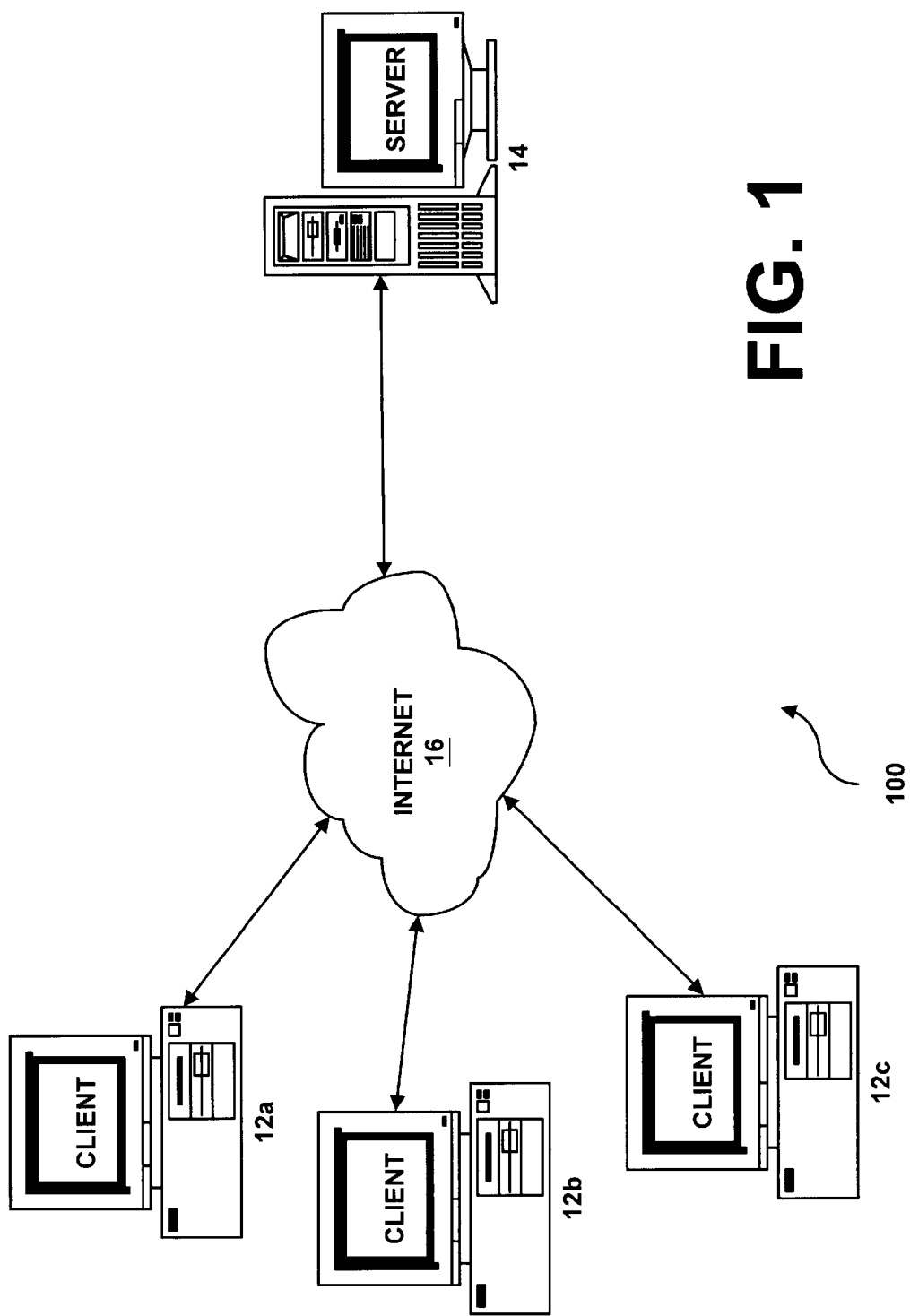
FIG. 1 is a block diagram illustrating an example of a network in which the present socket generation system may be implemented.

Referring now to the drawings, wherein like reference numerals designate corresponding parts throughout the drawings, FIG. 1 is a block diagram that illustrates a diagram of a network in which the present socket generation system 100 may be implemented. Referring to FIG. 1, a series of client computers 12a, 12b, 12c are connected to a server computer 14 via the Internet 16. The client computers 12a, 12b, 12c may be located within a local area network (LAN), or, each client computer 12a, 12b, 12c (hereinafter, 12) may be located at separate locations across a wide area network (WAN). It should be noted that the number of client computers and server computers may differ from the number presently illustrated. Further, it should also be noted that, while the preferred embodiment of the invention describes the relationship between a client computer and a server computer that communicate via the Internet, the client and server computers may, instead, both be located within a LAN, or a private WAN.

Figure 2:
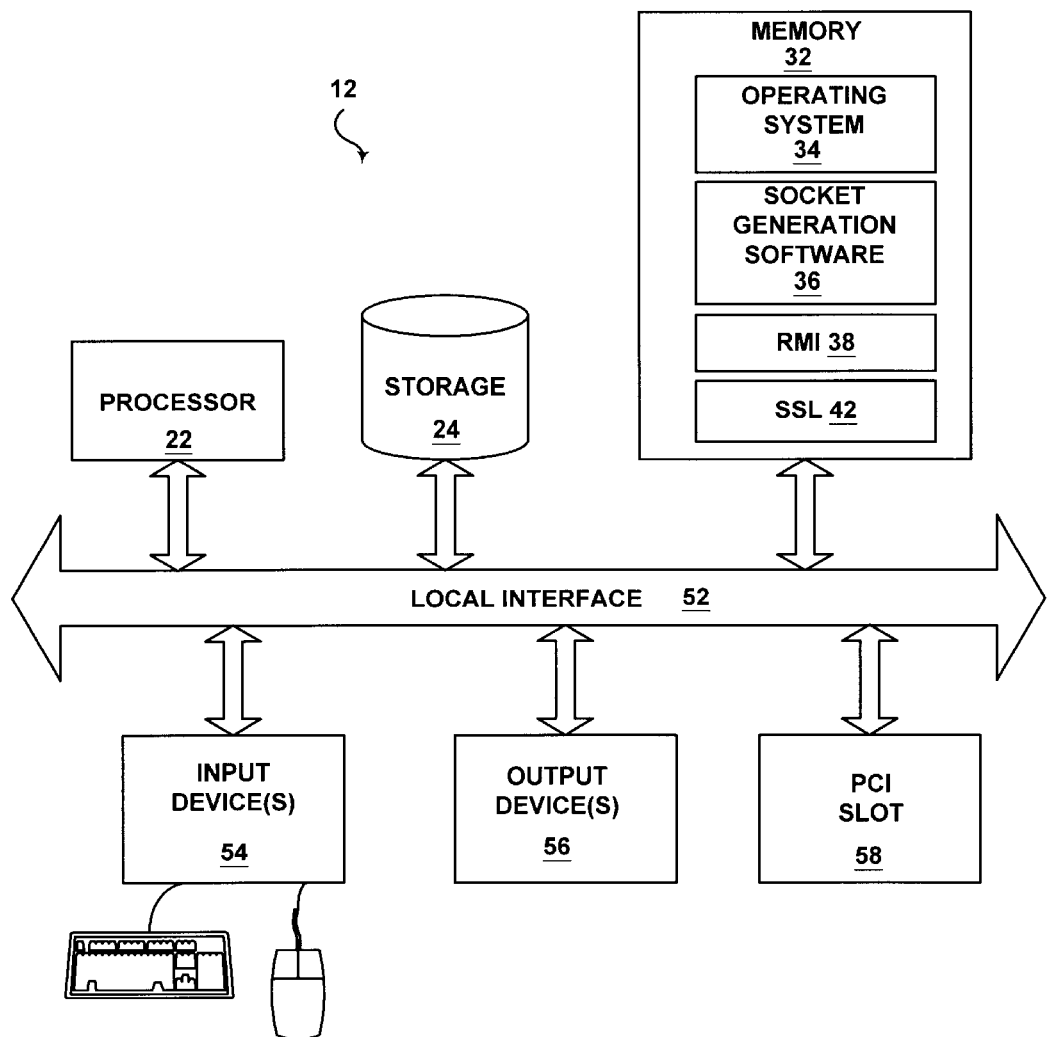
FIG. 2 is a block diagram that further illustrates a client computer shown by FIG. 1.

FIG. 2 is a block diagram that further illustrates a client computer 12, in accordance with the preferred embodiment of the invention. It should be noted that the server computer 14 preferably comprises the same protocols and components as the client computer 12 and therefore reference should be made to the description of the client computer 12 for a description of the server computer 14. Further, it should be noted that the client computer illustrated by FIG. 2 is provided merely as an example of a client computer 12. One skilled in the art will appreciate that the protocols and components provided within a client computer may differ from those illustrated by FIG. 2. As an example, the storage device illustrated by FIG. 2 may be located distant from the client computer 12, wherein received data is transmitted to the distant storage device for storage, instead of stored locally within a local storage device.

The client computer 12 generally comprises a processor 22, a storage device 24, and a computer memory 32. The computer memory 32 comprises an operating system 34 and socket generation software 36 therein. Also stored within the computer memory 26 are a remote method invocation (RMI) protocol 38, and a secure sockets layer (SSL) protocol 42, each of which is further discussed herein below. While the client and server computers 12, 14 utilize the RMI protocol 38, the present socket generation system and method may be provided to computers that utilize other protocols, such as, but not limited to, secure-hyper text transfer protocol (S-HTTP). The processor 22 accepts commands from the computer memory 32, as defined by the socket generation software 36, over a local interface 52, such as, for example, a bus(es), or a dedicated path. Specifically, with regard to the preferred embodiment of the invention, the local interface 52, is a PCI bus.

The client computer 12 also includes input device(s) 54 and output device(s) 56. Generally, the client computer 12 may run any of a number of different platforms and operating systems, including, but not limited to, the Unix®, WindowsNT®, SunSolaris® or any such operating system. In fact, it should be noted that, while both the client computer 12 and server computer 14 utilize the RMI protocol 38, it is not necessary that the client and server computers 12, 14 run the same platforms or operating systems. In addition, the client computer 12 and the server computer also need not comprise the same components. A PCI slot 58 is attached to the local interface 52 and provides a means for a peripheral device, such as a network interface card (NIC), to attach to the client computer 12.

Figure 3:
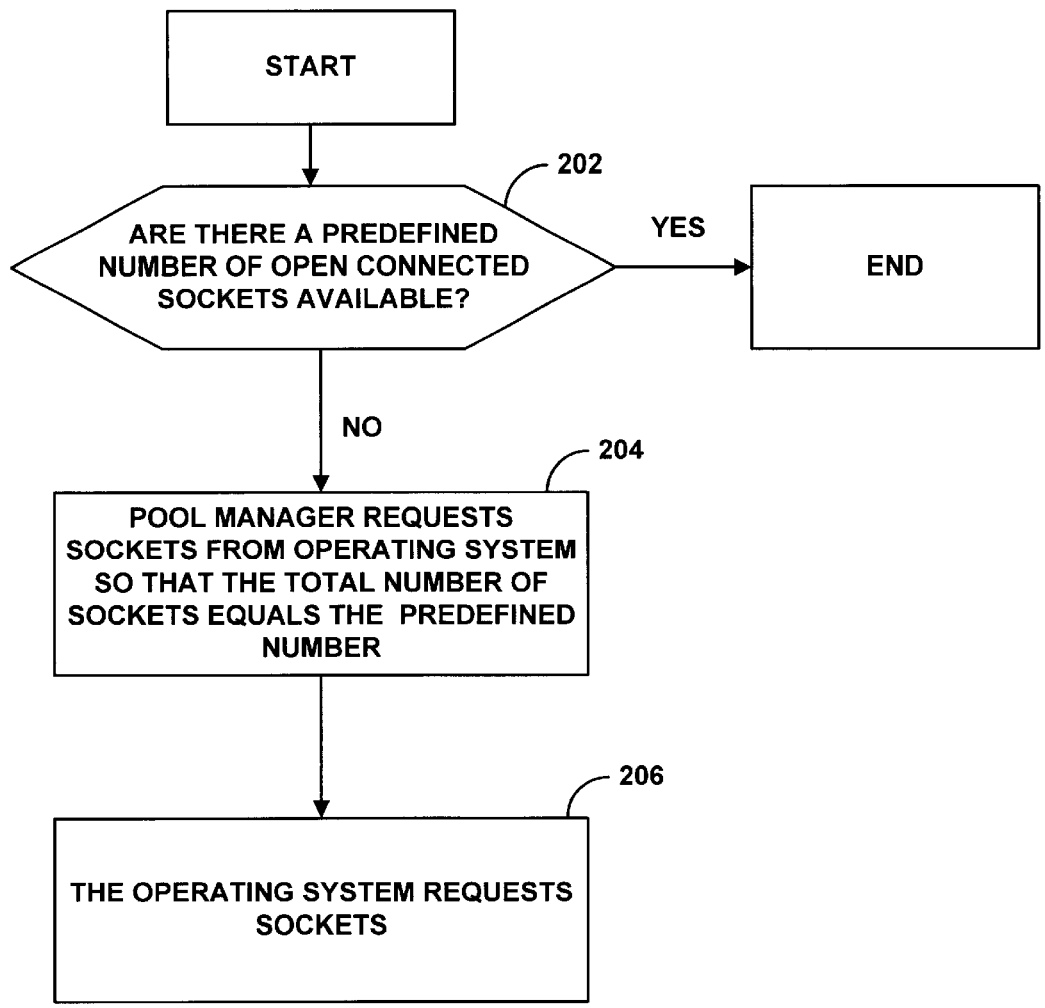
FIG. 3 is a flow chart illustrating the creation and maintenance of a socket pool by the pool manager located within the client computer of FIGS. 1 and 2.

FIG. 3 is a flow chart illustrating the creation and maintenance of a socket pool by a pool manager, in accordance with the preferred embodiment of the invention. In accordance with the preferred embodiment of the invention, the pool manager is a process defined by the socket generation software 36 (FIG. 1) of the client computer 12 (FIG. 1) and is described in detail herein below. With regard to the flow charts of FIGS. 3 and 4, each block represents a module, segment, or portion of code, which comprises one or more executable instructions for implementing the specified logical function(s). It should also be noted that in some alternate implementations, the functions noted in the blocks may occur out of the order noted. For example, two blocks shown in succession may in fact be executed substantially concurrently, or the blocks may sometimes be executed in the reverse order, depending upon the functionality involved.

As shown by block 202, when the client computer 12 (FIG. 1) is turned on, or initiated, the pool manager determines whether a predefined number of open connected sockets are available for the client computer 12 (FIG. 1). Preferably, the number of open connected sockets to be made available for the client computer 12 (FIG. 1) to use in the future is programmable via the socket generation system 100. Steps performed in the creation of a socket are further described herein below. Preferably, the pool manager performs the determination (block 202) by inspecting a list of data objects associated with open connected sockets. The list of data objects may be maintained within the computer memory 26 (FIG. 2) for use by the pool manager. As known by those skilled in the art, data objects include, but are not limited to, the IP address of an established port located on the server computer, and the port number. Therefore, when determining whether a predefined number of open connected sockets are available the pool manager makes the determination by determining how many data objects exist within the list. Herein after, the list of open connected sockets stored in the computer memory 26 (FIG. 1), which is preferably limited by the predefined number, is referred to as a socket pool.

It should be noted that the predefined number may be programmed by the socket generation software 36 (FIG. 2). Alternatively, the predefined number may be inputted by a user via an input device 54 (FIG. 2). The predefined number of open connected sockets may also be changed by the user or software 36 (FIG. 2) at any time. As shown by block 204, if the number of listed open connected sockets within the socket pool is less than the predefined number of open connected sockets, which acts as a threshold, the pool manager requests the difference in the number of sockets from the operating system 34 (FIG. 1) located within the client computer 12 (FIG. 1).

As shown by block 206, the operating system 34 (FIG. 2) of the client computer 12 (FIG. 1) then communicates with the operating system of the server computer 14 (FIG. 1) to create a total number of open connected sockets within the socket pool that is equal to the predefined number. As known in the art, the creation of an open connected socket is performed by a client computer receiving data from a server computer describing a newly opened socket to the server computer created in response to the request. As mentioned herein above, this data may include, but is not limited to an IP address and a port address. Once the data is received, a connection is made from the client computer that initially requested the connection, to the newly opened socket, thereby creating an open connected socket.

It should be noted that a check on the number of open connected sockets within the socket pool may be performed each time a socket is requested from the pool, thereby ensuring that the number of open connected sockets never remains below the predefined number. Alternatively, a check may be performed periodically in accordance with a set, or alternating schedule. As known in the art, obtaining sockets via an operating system presents substantial delay to application progression. Therefore, since having open connected sockets available within the socket pool limits the need for requesting that the operating system 34 (FIG. 2) obtain a socket for application communication, network efficiency is once again increased.

A separate socket pool may also be created, stored, and maintained by the server computer 14 (FIG. 1). The creation and maintenance of the socket pool within the server computer 14 (FIG. 1) is performed in the same manner as that performed by the client computer 12 (FIG. 1). Therefore, reference should be made to the detailed description of FIG. 3, provided herein above, for a description of socket pool creation and maintenance by the server computer 14. As such, further discussion of the creation and maintenance of the socket pool within the server computer 14 (FIG. 1) is not provided herein. It should be noted that, while beneficial, it is not necessary that the server computer 14 (FIG. 1) create, store, and maintain a separate socket pool for use by the server computer 14 (FIG. 1). In summary, three separate and distinct scenarios may exist in accordance with the present socket generation system 100. Namely, the client computer 12 (FIG. 1) may be the only computer that utilizes a socket pool; the server computer 14 (FIG. 1) may be the only computer that utilizes a socket pool; or, both the client computer 12 (FIG. 1) and the server computer 14 (FIG. 1) may utilize the socket pool.

Figure 4:
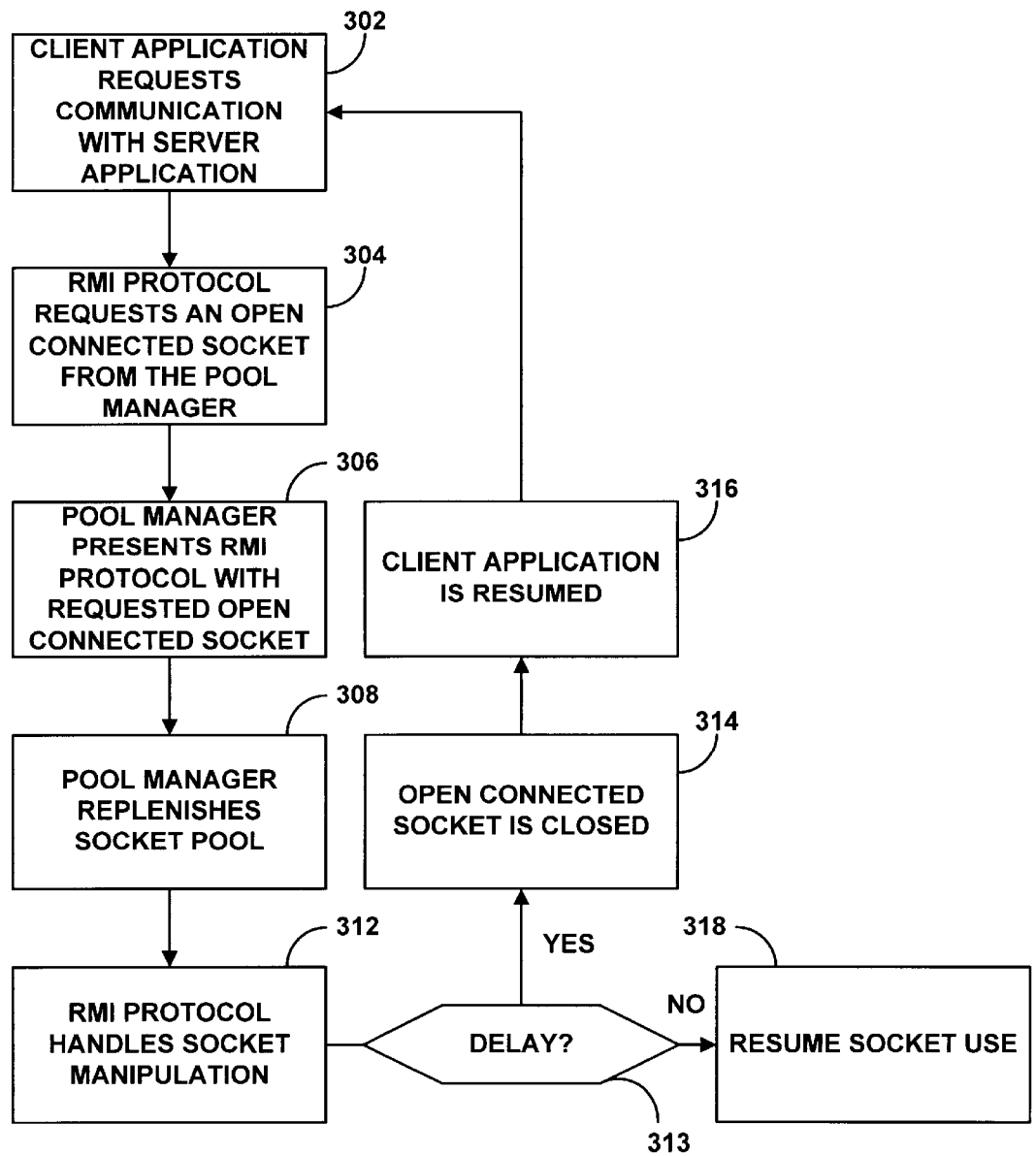
FIG. 4 is a flow chart illustrating the architecture, functionality, and operation of the socket generation system of FIG. 1.

FIG. 4 is a flow chart illustrating the architecture, functionality, and operation of the socket generation system 100 (FIG. 1), in accordance with the preferred embodiment of the invention. As shown by block 302, an application (not shown) running within the client computer 12 (FIG. 1) requests communication with an application (not shown) running Within the server computer 14 (FIG. 1). Specifically, these applications may comprise any applications that require communication from a client computer to a server computer, or from a server computer to a client computer. As an example, a medical program located on a client computer at a physician's office may require a connection to the same, or a different, program on a server computer located at a hospital where a patient was initially seen, for purposes of viewing and manipulating medical records.

In response to the communication request, the RMI protocol 38 (FIG. 2) requests an unused open connected socket from the pool manager to enable remote communication between the client application and the server application (block 304). It should be noted that, while the present client and server computers 12, 14 (FIG. 1) are assumed to use the Java language, resulting in use of the RMI protocol, the present socket generation method may be implemented within computers using other computer languages. As a result of using computers that are not Java compliant, protocols other than RMI will be used for socket management, however, the benefits of having a socket pool are maintained.

As shown by block 306, the pool manager then provides the RMI protocol 38 (FIG. 2) with an open connected socket from the socket pool, as requested by the client application
It should be noted that the providing of the open connected socket from the socket pool comprises providing data associated with the open connected socket, such as, but not limited to, the IP address and port address of the established socket. A detailed description of information stored within the socket pool has been provided herein above.

Of course, a larger number of open connected sockets may be requested by the RMI protocol 38 (FIG. 2), in which case the pool manager provides the requested number of open connected sockets, up to the number available within the socket pool. The pool manager then determines how many open connected sockets are required to replenish the socket pool to the required predetermined number of open connected sockets (block 308). A detailed discussion of socket pool maintenance has been provided herein above with reference to FIG. 3. Therefore, reference should be made to the disclosure of FIG. 3 for further discussion of socket pool maintenance.

As shown by block 312, once the RMI protocol 38 (FIG. 2) has received the requested open connected socket, the RMI protocol 38 (FIG. 2) handles standard socket manipulation for the client application. In accordance with the standard RMI protocol 38, if the open connected socket that has been established for the client application is not used for a specific amount of time (block 313), as defined by the standard RMI protocol 38 (FIG. 2), the socket will be closed (block 314). As a result, when use of the client application is resumed (block 316), the application within the client computer 12 (FIG. 1) once again requests communication with the application in the server computer 14 (FIG. 1) (block 302). However, since the open connected sockets are made available within the socket pool, there is no operating system delay incurred. If instead, the socket remains in use, the socket remains open for use by the client application (block 318). The process described by FIG. 4 is preferably continuously repeated, thereby ensuring network efficiency.

While the disclosure provided herein above has been provided with reference to a socket pool located within the client computer 12, as noted herein above, one skilled in the art will appreciate that the server computer 14 may also contain a socket pool. As a result, a server application will communicate with a client application in a manner similar to that used by the client application.

A first alternate embodiment of the invention utilizes a custom socket factory pool within the socket generation system 100. As known in the art, a custom RMI socket factory is useful when communication between an RMI client and an RMI server is made via a socket that encrypts or compresses data, or different types of sockets are used for different connections between varying applications. In accordance with the first alternate embodiment of the invention, the custom socket factory replaces the pool manager utilized by the preferred embodiment of the invention, while logical steps and functionality remain the same.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of providing and managing sockets for use in connecting a client application with a server application, comprising the steps of:

said client application requesting communication with said server application;

in response to said communication request from said client application, requesting an open connected socket from a socket pool;

receiving said open connected socket for communicating with said server application;

replenishing said socket pool; and providing communication between said client application and said server application via said received open connected socket.

2. The method of claim 1, wherein said client application is located on a client computer and said server application is located within a server computer.

3. The method of claim 1, wherein said client application and said server application are located within a first computer.

4. The method of claim 2, wherein said step of replenishing said socket pool further comprises the steps of:

said client computer requesting at least one open socket from said server computer; and said client computer receiving said at least one open socket from said server computer and connecting to said server computer to create at least one of said open connected sockets.

5. The method of claim 4, wherein the number of requested open sockets is determined by a predefined number of open connected sockets that are to remain in the socket pool.

6. The method of claim 1, wherein said step of replenishing is performed periodically.

7. The method of claim 5, wherein said step of replenishing said socket pool is performed in response to the number of sockets being below said predefined number of open connected sockets.

8. The method of claim 1, further comprising the step of maintaining communication between said client application and said server application.

9. The method of claim 1, wherein said step of requesting said open connected socket from said socket pool is performed by a remote method invocation protocol.

10. The method of claim 1, wherein said step of replenishing said socket pool is repeated each time the step of receiving said open connected socket occurs.

11. The method of claim 1, further comprising the step of requesting an additional open connected socket from said socket pool in response to said received open connected socket expiring and receiving an additional request by said client application to communicate with said server application.

12. A method of providing and managing sockets for use in connecting a client application with a server application, comprising the steps of:

said client application requesting communication with said server application;

in response to said communication request from said client application, requesting an open connected socket from a custom remote method invocation socket factory pool;

receiving said open connected socket for communicating with said server application;

replenishing said custom remote method invocation socket factory pool; and providing communication between said client application and said server application via said received open connected socket.

13. The method of claim 12, wherein said client application is located on a client computer and said server application is located within a server computer.

14. The method of claim 12, wherein said client application and said server application are located within a first computer.

15. The method of claim 13, wherein said step of replenishing said custom remote method invocation socket factory pool further comprises the steps of:

said client computer requesting at least one open socket from said server computer; and said client computer receiving said at least one open socket from said server computer and connecting to said server computer to create at least one of said open connected sockets.

16. The method of claim 15, wherein the number of requested open sockets is determined by a predefined number of open connected sockets that are to remain in said custom remote method invocation socket factory pool.

17. The method of claim 12, wherein said step of replenishing is performed periodically.

18. The method of claim 16, wherein said step of replenishing said custom remote method invocation socket factory pool is performed in response to said number of sockets being below said predefined number of open connected sockets.

19. A system for providing and managing sockets for use in connecting a client application with a server application, comprising:

means for requesting communication between said client application and said server application;

means for requesting an open connected socket from a socket pool, communicatively coupled to said means for requesting communication;

means for receiving said open connected socket for communicating between said client application and said server application, communicatively coupled to said means for requesting an open connected socket and said means for requesting communication;

means for replenishing said socket pool, communicatively coupled to said means for receiving, said means for requesting an open connected socket, and said means for requesting communication; and means for providing communication between said client application and said server application via said received open connected socket, communicatively coupled to said means for replenishing, said means for receiving, said means for requesting an open connected socket, and said means for requesting communication.

20. The system of claim 19, wherein said client application is located on a client computer and said server application is located within a server computer.

21. The system of claim 19, wherein said client application and said server application are located within a first computer.

22. The system of claim 20, wherein said means for replenishing said socket pool further comprises:

a means for requesting at least one open socket from said server computer; and a means for receiving said at least one open socket from said server computer and connecting to said server computer to create at least one of said open connected sockets.

23. The system of claim 22, wherein the number of requested open sockets is determined by a predefined number of open connected sockets that are to remain in said socket pool.

24. The system of claim 19, wherein said means for replenishing replenishes said socket pool periodically.

25. The system of claim 23, wherein said means for replenishing replenishes said socket pool in response to said number of sockets being below said predefined number of open connected sockets.

26. A system for providing and managing sockets for use in connecting a client application with a server application, comprising:

means for requesting communication between said client application and said server application;

means for requesting an open connected socket from a custom remote method invocation socket factory pool, communicatively coupled to said means for requesting communication;

means for receiving said open connected socket for communicating between said client application and said server application, communicatively coupled to said means for requesting an open connected socket and said means for requesting communication;

means for replenishing said custom remote method invocation socket factory pool, communicatively coupled to said means for receiving, said means for requesting an open connected socket, and said means for requesting communication; and means for providing communication between said client application and said server application via said received open connected socket, communicatively coupled to said means for replenishing, said means for receiving, said means for requesting an open connected socket, and said means for requesting communication.

27. A system for providing and managing sockets for use in connecting a client application with a server application, comprising:

a memory;

a pool manager defined within said memory for requesting and maintaining a number of open connected sockets within a socket pool in response to a request from said client application, wherein said socket pool is stored within said memory; and a protocol defined within said memory for receiving at least one open connected socket from said socket pool in response to a request from said client application, wherein said pool manager replenishes said number of open connected sockets in accordance with a number of sockets provided to said client application.

28. The system of claim 27, wherein said protocol is a remote method invocation protocol.

29. The system of claim 27, wherein said client application is located within a client computer and said server application is located within a server computer.

30. The system of claim 29, wherein said client application and said server application are located within a first computer.

31. The system of claim 27, further comprising an operating system defined within said memory for establishing said open connected socket between said client application and said server application.

32. The system of claim 29, wherein said socket pool is further defined as a series of data objects that comprise a port address and an Internet protocol address of said server computer.

33. A method of providing and managing sockets for use in connecting a client application with a server application, comprising the steps of:

said server application receiving a communication request from said client application;

in response to receiving said communication request from said client application, requesting an open connected socket from a socket pool;

receiving said open connected socket for communicating with said client application;

replenishing said socket pool; and providing communication between said client application and said server application via said received open connected socket.

34. The method of claim 33, wherein said server application is located within a server computer and said client application is located on a client computer.

35. The method of claim 33, wherein said client application and said server application are located within a first computer.

36. The method of claim 34, wherein said step of replenishing said socket pool further comprises the steps of:

said server computer requesting at least one open socket from said client computer; and said server computer receiving said at least one open socket from said client computer and connecting to said client computer to create at least one of said open connected sockets.

37. The method of claim 36, wherein the number of requested open sockets is determined by a predefined number of open connected sockets that are to remain in the socket pool.

38. The method of claim 33, wherein said step of replenishing is performed periodically.

39. The method of claim 37, wherein said step of replenishing said socket pool is performed in response to the number of sockets being below said predefined number of open connected sockets.

40. The method of claim 33, further comprising the step of maintaining communication between said server application and said client application.

41. The method of claim 33, wherein said step of requesting said open connected socket from said socket pool is performed by a remote method invocation protocol.

42. The method of claim 33, wherein said step of replenishing said socket pool is repeated each time the step of receiving said open connected socket occurs.

43. The method of claim 33, further comprising the step of requesting an additional open connected socket from said socket pool in response to said received open connected socket expiring and receiving an additional request by said server application to communicate with said client application.

* * * * *